United States Patent
Nukisato et al.

(10) Patent No.: US 7,613,020 B2
(45) Date of Patent: Nov. 3, 2009

(54) DISCHARGE LAMP BALLAST APPARATUS COMPRISING DC/DC CONVERTERS HAVING AT LEAST TWO TRANSFORMERS AND OUTPUTTING TWO KINDS OF VOLTAGES

(75) Inventors: Yasuhiro Nukisato, Tokyo (JP); Takashi Ohsawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 11/666,069

(22) PCT Filed: Oct. 25, 2005

(86) PCT No.: PCT/JP2005/019611

§ 371 (c)(1),
(2), (4) Date: Apr. 23, 2007

(87) PCT Pub. No.: WO2006/075428

PCT Pub. Date: Jul. 20, 2006

(65) Prior Publication Data

US 2007/0247088 A1     Oct. 25, 2007

(30) Foreign Application Priority Data

Jan. 13, 2005   (JP) .............................. 2005-006503

(51) Int. Cl.
*H02M 7/00*  (2006.01)
*H05B 37/00*  (2006.01)
(52) U.S. Cl. .............................. 363/67; 363/68; 363/71; 363/61; 363/21.14; 315/200 R; 315/207; 315/247; 315/291

(58) Field of Classification Search ............... 363/21, 363/21.12, 21.15, 21.16, 65–71; 315/247, 315/246, 274–289, 224, 225, 207, 206, 205, 315/203, 200 R; 351/247, 246, 224, 225, 351/207, 206, 205, 203, 200 R, 274–279; 323/282, 280, 222, 228, 229, 230, 287, 344, 323/345, 346, 351, 259, 266
See application file for complete search history.

(56) References Cited

U.S. PATENT DOCUMENTS

| | | | | |
|---|---|---|---|---|
| 4,292,592 A * | 9/1981 | Birdwell et al. | ............. | 315/500 |
| 4,814,965 A * | 3/1989 | Petersen | ...................... | 363/65 |
| 5,272,613 A * | 12/1993 | Buthker | ...................... | 363/21.1 |
| 5,416,364 A * | 5/1995 | Divjak | ........................ | 327/535 |
| 5,796,595 A * | 8/1998 | Cross | ........................... | 363/71 |

(Continued)

FOREIGN PATENT DOCUMENTS

JP          49-125220          10/1974

(Continued)

*Primary Examiner*—Tuyet Vo
(74) *Attorney, Agent, or Firm*—Birch, Stewart, Kolasch & Birch, LLP

(57) ABSTRACT

A discharge lamp ballast apparatus includes a DC/DC converter having a transformer T1 and a DC/DC converter having a transformer T2, which are connected in parallel; a control section 4 for controlling the output voltages of the DC/DC converters by varying their duties with shifting the operation phases of the transformers T1 and T2 of the DC/DC converters; and a voltage-multiplier rectifier circuit having diodes 7-9 and capacitors 10-12 for generating a high voltage used for starting a discharge lamp 22 by utilizing the potential difference between the output voltages of the transformers T1 and T2.

14 Claims, 3 Drawing Sheets

U.S. PATENT DOCUMENTS

| | | | |
|---|---|---|---|
| 7,009,852 B2 * | 3/2006 | Ying et al. | 363/17 |
| 2002/0109469 A1 * | 8/2002 | Ito et al. | 315/291 |
| 2006/0076935 A1 * | 4/2006 | Wiseman | 322/20 |

FOREIGN PATENT DOCUMENTS

| | | | |
|---|---|---|---|
| JP | 59-196594 A | 11/1984 | |
| JP | 7-142182 A | 6/1995 | |
| JP | 9-047022 A | 2/1997 | |
| JP | 9-69393 A | 3/1997 | |
| JP | 9-191649 A | 7/1997 | |

* cited by examiner

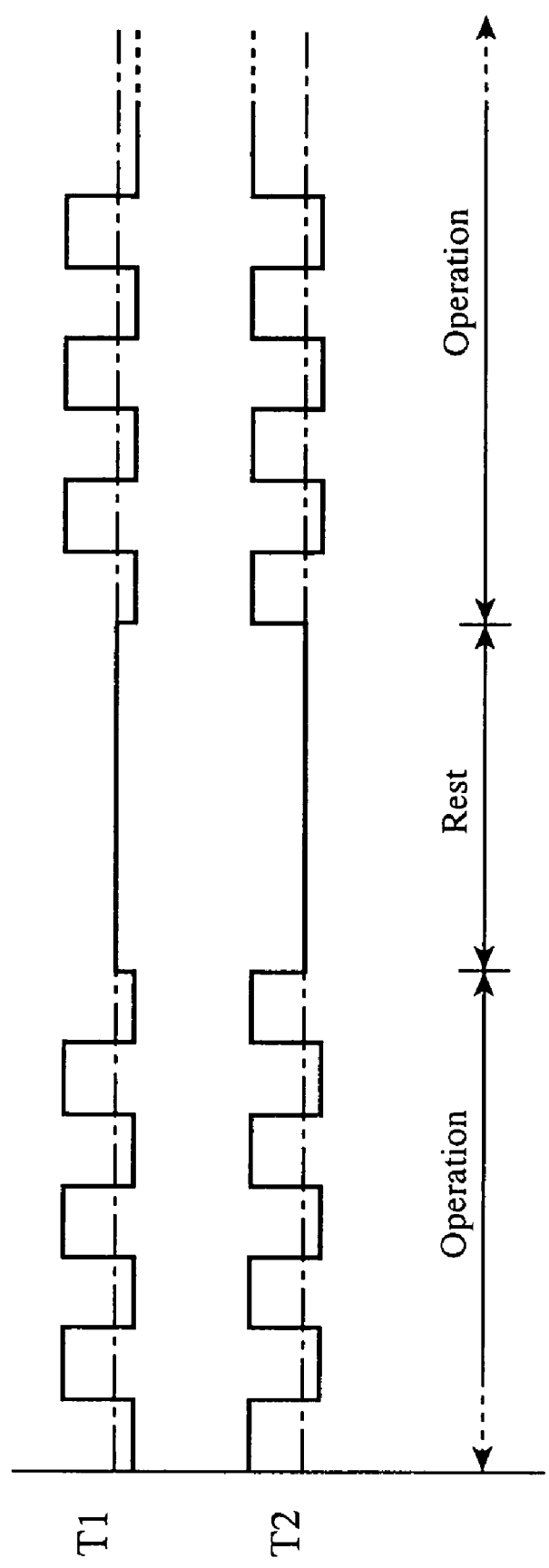

US 7,613,020 B2

DISCHARGE LAMP BALLAST APPARATUS COMPRISING DC/DC CONVERTERS HAVING AT LEAST TWO TRANSFORMERS AND OUTPUTTING TWO KINDS OF VOLTAGES

TECHNICAL FIELD

The present invention relates to a discharge lamp ballast apparatus having a DC/DC converter for lighting a discharge lamp.

BACKGROUND ART

To turn on a discharge lamp, it is necessary in the first place to produce a breakdown between electrodes of the discharge lamp by applying a high voltage across the electrodes. For generating the breakdown between the electrodes, an impulse high voltage is used which is generated across the secondary winding of an ignition (abbreviated to IGN from now on) transformer when the charges stored in a capacitor are discharged through the primary winding of the IGN transformer.

The turns ratio between the primary and secondary windings of the IGN transformer can be reduced by increasing the voltage to be discharged from the capacitor to the primary winding of the IGN transformer. In other words, increasing the voltage applied to the primary winding of the IGN transformer makes it possible to reduce the number of turns of the secondary winding. This enables using a thick wire to reduce resistance, and miniaturization of the IGN transformer. For this reason, the discharge lamp ballast apparatus has a circuit for applying a high voltage to the IGN transformer.

A conventional discharge lamp ballast apparatus has a step-up transformer for boosting the voltage of an AC power supply, and generates a DC high voltage through a voltage-doubler rectifier circuit composed of a plurality of diodes on the secondary side of the step-up transformer. The discharge lamp is started by charging the capacitor with the DC high voltage and by using the charges stored in the capacitor (see Patent Document 1, for example).

Alternatively, there is another apparatus which causes the secondary winding to output a boosted AC voltage by interrupting the DC voltage output from a ballast circuit with a switching device such as a saidac and by applying it to the primary winding of a transformer; generates a high voltage by supplying the AC voltage to a voltage-doubler rectifier circuit; and turns on the discharge lamp by charging the capacitor with the high voltage and by supplying the IGN transformer with the charges discharged from the capacitor in the same manner as described above (see Patent Document 2, for example).

In addition, there is still another apparatus which has a DC boosting circuit including a transformer, a DC-to-AC converter circuit and a start pulse generator circuit, and which turns on the discharge lamp by causing a capacitor in the start pulse generator circuit to output a high pulse voltage in synchronization with the operation of the DC-to-AC converter circuit. On the secondary side of the transformer of the DC boosting circuit, a winding is provided for generating the high voltage for starting the discharge lamp, and the start pulse circuit stores the power fed from the winding in the capacitor. When the voltage across the capacitor reaches a predetermined value, a self-breakdown-switching device in the start pulse circuit leads to breakdown. The pulse voltage generated at the breakdown is superimposed on a pulse voltage output from a bridge circuit constituting a DC-to-AC converter circuit, and the voltage is applied to the discharge lamp to turn it on (see Patent Document 3, for example).

The self-breakdown-switching device in the start pulse generator circuit has an air gap that leads to breakdown and is brought into conduction when a voltage about 1000 V is applied. In other words, the start pulse generator circuit charges the capacitor with the voltage higher than 1000 V. To generate the high voltage about 1000 V using the voltage-doubler rectifier circuit, it is necessary to input a high voltage greater than 500 V, or to construct the voltage-doubler rectifier circuit as a three or more voltage multiplier circuit if the input is about 300 V. To generate a high voltage about 1000 V, the circuit is configured using high-breakdown voltage components, or the circuit for generating the multiplied voltage with many components. In view of this, the foregoing apparatus obtains the high voltage by using the DC boosting circuit, DC-to-AC converter circuit and start pulse generator circuit. More practically, it is preferable to obtain the high voltage by generating a triple voltage.

Patent Document 1: Japanese patent application laid-open No. 59-196594/1984 (pages 2 and 3, and FIG. 2)

Patent Document 2: Japanese patent application laid-open No. 9-69393/1997 (pages 4 and 5, and FIG. 1)

Patent Document 3: Japanese patent application laid-open No. 7-142182/1995 (pages 3 and 4, and FIG. 1)

With such a configuration, the conventional discharge lamp ballast apparatus has the voltage-multiplier rectifier circuit placed on the output side of the DC-to-AC converter circuit (DC/AC inverter) that outputs a comparatively low frequency AC voltage. Thus, it not only takes a long time for recharging the capacitor of the IGN circuit for starting the discharge lamp, but also requires a capacitor with a large capacitance for the voltage-multiplier rectifier circuit. In addition, a large number of parts required to construct the circuit present a problem of making the miniaturization difficult.

The present invention is implemented to solve the foregoing problems. Therefore it is an object of the present invention to provide a discharge lamp ballast apparatus capable of miniaturization and cost reduction by eliminating the winding for starting the discharge lamp from the transformer in the DC/DC converter, and by simplifying the voltage-multiplier rectifier circuit.

DISCLOSURE OF THE INVENTION

A discharge lamp ballast apparatus in accordance with the present invention includes: a plurality of DC/DC converters which include transformers for boosting a power supply voltage, and are connected in parallel; control means for carrying out control in such a manner as to shift the operation phases of the transformers of the DC/DC converters; and a voltage-multiplier rectifier circuit for generating a high voltage used for starting a discharge lamp by utilizing a potential difference between output voltages of the transformers.

According to the present invention, the discharge lamp ballast apparatus includes the control means for controlling the operation of the transformers of the plurality of DC/DC converters to shift the phases of the output voltages; and the voltage-multiplier rectifier circuit used for generating the high voltage used for starting the discharge lamp by utilizing the potential difference between the output voltages. Thus, the discharge lamp ballast apparatus offers an advantage of being able to reduce its size and cost.

BRIEF DESCRIPTION OF THE DRAWINGS

FIG. 3 is a diagram illustrating the operation of the discharge lamp ballast apparatus of the embodiment 1.

BEST MODE FOR CARRYING OUT THE INVENTION

The best mode for carrying out the invention will now be described with reference to the accompanying drawings to explain the present invention in more detail.

Embodiment 1

Figure 1:
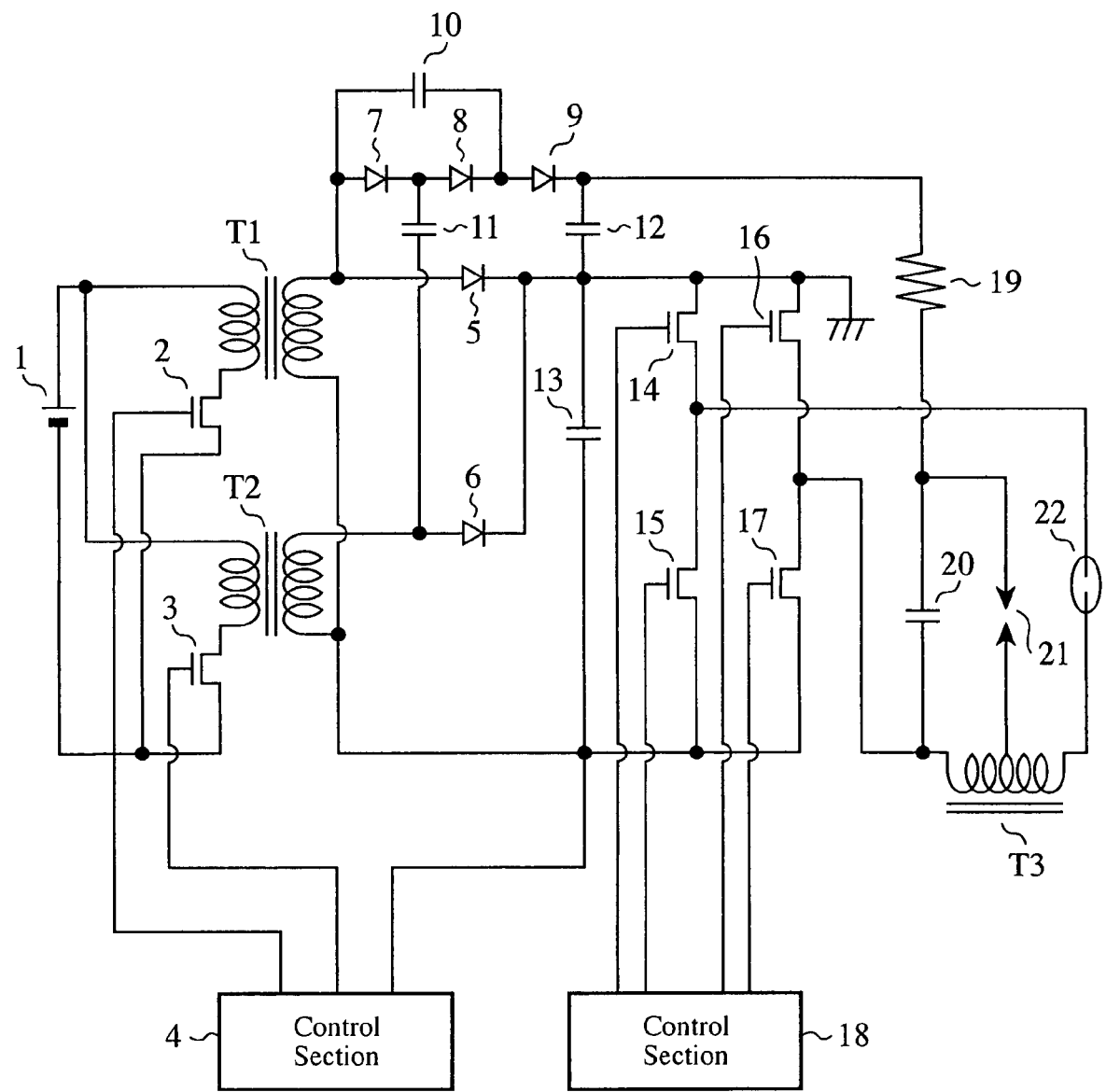
FIG. 1 is a circuit diagram of a discharge lamp ballast apparatus of an embodiment 1 in accordance with the present invention.

FIG. 1 is a circuit diagram of a discharge lamp ballast apparatus of an embodiment 1 in accordance with the present invention. A transformer T1 and transformer T2 each have a first end of their primary winding connected to a positive electrode of a power supply 1 that supplies DC power. The transformer T1 has a second end of its primary winding connected to a switching device 2 that switches ON and OFF between the transformer T1 and the negative electrode of the power supply 1. The transformer T2 has a second end of its primary winding connected to a switching device 3 that switches ON and OFF between the transformer T2 and the negative electrode of the power supply 1. A control section (control means) 4 is connected to the control signal input terminals of the switching devices 2 and 3. For example, when FETs are employed as the switching devices 2 and 3, the control section 4 is connected to their gate terminals.

The transformer T1 has a first end of its secondary winding connected to the anode of a diode 5, the anode of a diode 7 and a first end of a capacitor 10. The transformer T2 has a first end of its secondary winding to the anode of a diode 6 and a first end of a capacitor 11. The capacitor 11 has its second end connected to the cathode of the diode 7. The diode 7 has its cathode connected to the anode of the diode 8, and the diode 8 has its cathode connected to the anode of a diode 9. In other words, the diodes 7-9 are connected in series. The capacitor 10 has its second end connected to the connection point of the diode 8 and diode 9.

The diode 5 has its cathode connected to the cathode of the diode 6, and further to a first end of a capacitor 12, a first end of a capacitor 13 and transistors 14 and 16. The connection point is grounded. The transformer T1 has a second end of its secondary winding connected to a second end of the secondary winding of the transformer T2, and further to a second end of the capacitor 13 and transistors 15 and 17.

The switching device 2, control section 4, transformer T1, diode 5, and capacitor 13 which are connected as described above constitute a DC/DC converter for boosting the DC voltage of the power supply 1. In addition, the switching device 3, control section 4, transformer T2, diode 6, and capacitor 13 constitute a DC/DC converter similar to that described above. Thus, the discharge lamp ballast apparatus as shown in FIG. 1 has two DC/DC converters connected in parallel. The outputs of the two DC/DC converters are combined to a single voltage across the capacitor 13, and supplied to a DC/AC inverter, which will be described later.

In addition, the diodes 7-9 and capacitors 10-12 constitute a voltage-multiplier rectifier circuit. In combination with the two DC/DC converters, the voltage-multiplier rectifier circuit generates double the voltage of the output voltage of the DC/DC converters, and supplies it to an IGN circuit, which will be described later.

The transistor 14 and transistor 15 are connected in series, and the transistor 16 and transistor 17 are connected in series. The transistors 14-17 constitute an H-type bridge circuit. When n-channel FETs are employed as the transistors 14-17, for example, the transistor 14 has its source connected to the drain of the transistor 15, and the transistor 16 has its source connected to the drain of the transistor 17. The transistor 14 has its drain connected to the drain of the transistor 16, and the transistor 15 has its source connected to the source of the transistor 17. In such a configuration, the transistors 14 and 16 have their drains connected to the cathodes of the diodes 5 and 6 and to the first ends of the capacitors 12 and 13 as described above. The transistors 15 and 17 have their source connected to the second ends of the secondary windings of the transformers T1 and T2 and to the second end of the capacitor 13.

The connection point of the transistor 14 and transistor 15 is connected to a first electrode of the discharge lamp 22. The connection point of the transistor 16 and transistor 17 is connected to a first end of a capacitor 20 and a primary winding end of an IGN transformer T3. The ON and OFF operation of the transistors 14-17 is controlled by a control section 18. When n-channel FETs are employed as the transistors 14-17 as described above, the transistors 14-17 have their gates connected to the control section 18 which controls the gate voltages. The transistors 14-17 and control section 18 connected in the form of the H-type bridge circuit constitute a DC/AC inverter for supplying an AC voltage to the discharge lamp 22.

The IGN transformer T3 has its secondary winding end connected to a second electrode of the discharge lamp 22. The diode 9 has its cathode connected to a first end of a resistor 19. The resistor 19 has its second end connected to a first end of a second end of the capacitor 20 and to a GAP switch 21. The GAP switch 21 is a switch that is brought into conduction when a high voltage is applied to its two ends. It has a discharge gap that leads to breakdown and conducts when a high voltage about 800 V is applied, for example. The IGN transformer T3 is an autotransformer having a single winding, part of which is common to both the primary winding and secondary winding. The common end of the primary winding and secondary winding is connected to a second end of the GAP switch 21. The IGN transformer T3, resistor 19, capacitor 20 and GAP switch 21 thus connected constitute an IGN circuit for starting the discharge lamp 22.

The control section 4 is connected in such a manner as to detect the output voltage of the DC/DC converters, which is used to turn on the discharge lamp 22. For example, it is connected to the connection point of the capacitor 13 and the transistors 15 and 17 to detect the voltage across the capacitor 13.

Next, the operation will be described.

To turn on the discharge lamp 22, the control section 18 carries out the control in such a manner as to bring the transistors 14 and 17 into the ON state and the transistors 15 and 16 into the OFF state. In this state, the control section 4 controls the operation of the switching devices 2 and 3 so that the high voltage is generated across the secondary winding of the transformers T1 and T2. The high voltage is converted by the diodes 5 and 6 and capacitor 13 to a DC voltage of 400 V, for example, which is applied to the discharge lamp 22 via the ON state transistors 14 and 17. Here, the voltage across the capacitor 13 is the output voltages of the DC/DC converters. In addition, the output voltages of the DC/DC converters are a ballast voltage for lighting the discharge lamp 22 after the turn-on.

As described before, the voltage-multiplier rectifier circuit composed of the diodes 7-9 and capacitors 10-12 boosts the pulse voltage generated across the secondary windings of the transformer T1 and transformer T2, and generates the DC high voltage. The DC high voltage is applied to the capacitor 20 via the resistor 19. As the capacitor 20 is charged, and the voltage across the capacitor 20 reaches the predetermined high voltage, the GAP switch 21 closes. Thus, the power stored in the capacitor 20 is supplied to the primary coil of the IGN transformer T3. At that time, the pulse voltage generated across the secondary coil of the IGN transformer T3 is superimposed on the ballast voltage applied from the capacitor 13 to the discharge lamp 22. Thus the discharge between the electrodes of the discharge lamp 22 is started. Once the discharge lamp 22 has been started, the control section 18 turns ON and OFF the transistors 14 and 17 and transistors 15 and 16 alternately to change the direction of the current flowing from the DC/DC converters to the discharge lamp 22. Thus, the AC voltage is supplied to the discharge lamp 22, which stabilizes the discharge lighting and enables the steady lighting. The discharge ballast apparatus of the embodiment 1 operates in this manner generally to light the discharge lamp 22.

The discharge ballast apparatus of the embodiment 1 in accordance with the present invention is characterized by the operation that starts the discharge lamp 22 during the foregoing operation. Here, the description will be omitted of the operation during the steady lighting under the control of the control section 18.

The transformer T1 and transformer T2 carry out flyback operation. For example, the transformer T1 stores the power supplied from the power supply 1 to the primary winding during the ON state of the switching device 2, and outputs the stored power from the secondary winding when the switching device 2 is turned OFF. The transformer T2 carries out the same output operation in response to the ON and OFF operation of the switching device 3.

Figure 2:
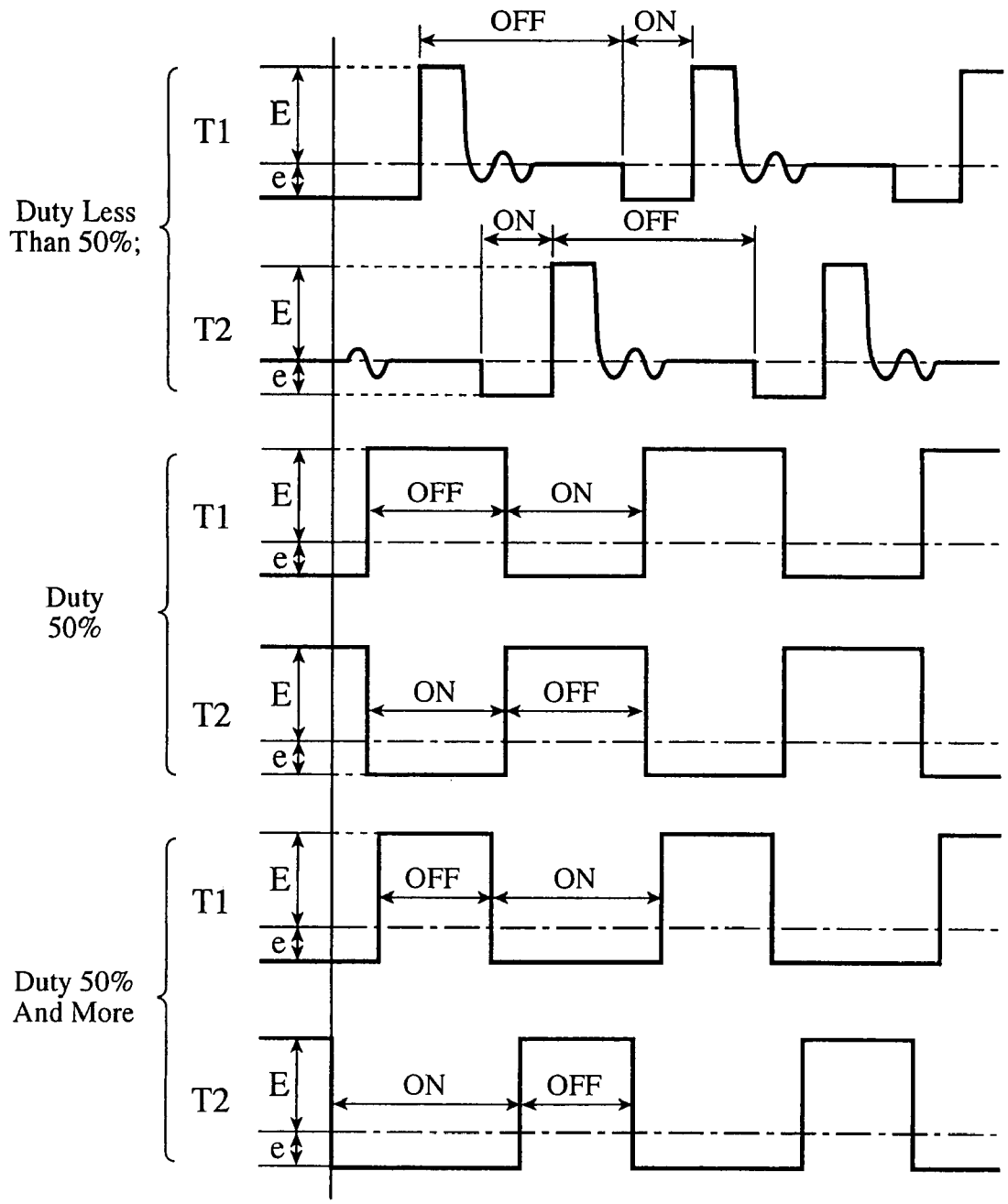
FIG. 2 is a diagram illustrating the operation of the discharge lamp ballast apparatus of the embodiment 1.

FIG. 2 is a diagram illustrating the operation of the discharge lamp ballast apparatus of the embodiment 1, which is a timing chart illustrating voltage waveforms output from the secondary windings of the transformer T1 and transformer T2. The waveforms at the top of FIG. 2 indicated by "duty less than 50%" are output waveforms when the duty ratio of the ON and OFF (referred to as "ON duty ratio" from now on) of the switching devices 2 and 3 is less than 50%, which means that the ON state is shorter than the OFF state. The waveforms in the middle of FIG. 2 indicated by "duty 50%" are waveforms when the ON duty ratio of the switching devices 2 and 3 is 50%, that is, when the duration of the ON state is equal to that of the OFF state. The waveforms at the bottom of FIG. 2 indicated by "duty 50% or more" are output waveforms when the ON duty ratio of the switching devices 2 and 3 is equal to or greater than 50%, which means that the ON state is longer than the OFF state.

The switching device 2 and switching device 3 are controlled by the control section 4 in such a manner as to turn ON and OFF alternately. The primary windings of the transformer T1 and transformer T2 are connected in parallel to the power supply 1. Thus, the switching devices 2 and 3 which are turned ON and OFF alternately cause the current to flow through the primary windings alternately.

The description will now be made by way of example of the transformer T1. In the flyback operation, when the switching device 2 is in the OFF state, a voltage E is output which is boosted to the high voltage. When the switching device 2 is in the ON state, the transformer T1 outputs a voltage e which is given by $e = V_{IN} \cdot N2/N1$, where N1 is the number of turns of the primary winding of the transformer T1, N2 is the number of turns of its secondary winding and VIN is the voltage supplied from the power supply 1. Thus, as illustrated in FIG. 2, the transformer T1 and transformer T2 output the asymmetric pulse voltages such as alternate positive voltage E and negative voltage e.

To turn on the GAP switch 20, a high voltage power supply of 1000 V or more is required. Thus, the voltage-multiplier rectifier circuit composed of the diodes 7-9 and capacitors 10-12 shown in FIG. 1 generates the high voltage by making use of the potential difference between the output voltages of the two transformers T1 and T2, that is, by utilizing the peak-to-peak voltage of the superposition of the output voltages of the transformers T1 and T2. As will be described later, when the potential difference between the output voltages of the two transformers T1 and T2 is large, the high voltage is easily generated, which enables quick charge of the capacitor 20 constituting the IGN circuit. In addition, compared with the case where the output voltage of a single transformer is used, the voltage-multiplier rectifier circuit can be configured with a fewer number of diodes and capacitors.

For example, as for the output voltage of the transformer T1 and the output voltage of the transformer T2 whose phases are shifted by 180° as the waveforms indicated by "duty 50%" in the middle of FIG. 2, the superposition of these waveforms will provide a peak-to-peak voltage of E+e. In the case of using the two transformers in this way, if each ON state of the switching device 2 is shorter than each OFF state thereof as the waveform indicated by "duty less than 50%" at the top of FIG. 2 and hence the power stored in the transformer T1 is insufficient, the pulse voltage output from the transformer T1 during the OFF state of the switching device 2 maintains the voltage E for a short period, and falls to the GND level, resulting in the state without the voltage output. If the transformers T1 and T2 output the voltage E for a short period and lack the output voltage thereafter, it is difficult to store sufficient charges into the capacitor 11 constituting the voltage-multiplier rectifier circuit. This will disable the normal operation of the voltage-multiplier rectifier circuit.

To perform the normal operation of the voltage-multiplier rectifier circuit, it is preferable that the transformer T1 and transformer T2 output the pulse voltage having equal ON state and OFF state periods as the waveforms indicated by "duty 50%" in the middle of FIG. 2, and that the operation of the switching devices 2 and 3 be controlled in such a manner that the voltage E+e is always obtained which is the superposition of the output voltages. Alternatively, as the waveforms indicated by "duty 50% or more" at the bottom of FIG. 2, the transformers T1 and T2 are operated in such a manner that their voltage outputs are not eliminated. In other words, the transformers T1 and T2 are operated in such a manner that the high-side output voltage E and low-side output voltage e, which are output from the transformers T1 and T2, are superposed.

The control section 4 operates the switching device 2 and switching device 3 in such a manner that their ON/OFF timings are shifted by 180°, and that the voltage-multiplier rectifier circuit is supplied with the voltage E+e, that is, the potential difference between the output voltages of the transformer T1 and transformer T2, by setting the ON duty ratio at 50% or more. Preferably, the control section 4 operates the switching devices 2 and 3 in such a manner as to maintain the voltage E+e for a long time by setting the ON duty ratio at 50%.

Thus, the control section 4 operates the transformers T1 and T2, and each of the DC/DC converters including the transformer T1 or transformer T2 in such a manner as to supply the voltage-multiplier rectifier circuit with a large potential difference from the transformers T1 and T2 as long as possible, thereby supplying the voltage-multiplier rectifier circuit with the largest possible power.

The capacitor 11 has its first end supplied with the voltage output from the transformer T1 via the diode 7 and its second end with the voltage output from the transformer T2, thereby being charged and producing the voltage E+e across it. The diode 8 has its anode supplied with the voltage E+e from the capacitor 11 so that the voltage 2E+2e is produced across the capacitor 10, which is charged via the diode 8. The diode 9, which is supplied with the voltage 2E+2e, has its cathode connected to the first end of the capacitor 12 so that the voltage across the capacitor 12 becomes 2E+2e. The capacitor 12 is connected in series with the capacitor 13. The series capacitor of the capacitor 12 and capacitor 13 has the potential difference 3E+2e across it, and produces the high voltage about 1200 V, for example.

The capacitor 20 has its first end supplied with a current from the connection point between the diode 9 and capacitor 12. The capacitor 20 is charged by the current so that the voltage across the capacitor 20 is increased to the voltage 3E+2e at its peak. When the capacitor 20 is charged in this way, and the voltage across it reaches the predetermined high voltage of 800 V or more, the GAP switch 21 closes, and the discharge current of the capacitor 20 flows through the primary coil of the IGN transformer T3, thereby generating the high pulse voltage across the secondary coil of the IGN transformer T3. The pulse voltage is applied to the discharge lamp 22 to start lighting.

To start the discharge lamp 22, both the capacitor 13 and capacitor 20 must be charged to the predetermined high voltages. To bring the discharge lamp 22 into a steady lighting state, it is enough to apply the voltage of about 400 V to the discharge lamp 22 before breakdown. The capacitor 13 receives the power supply from the transformers T1 and T2 to maintain the voltage across it at the voltage necessary for the steady lighting, that is, at the ballast voltage.

Generally, the ON duty ratio of the transformers T1 and T2 is adjusted in such a manner as to maintain the voltage across the capacitor 13 once it has reached the predetermined value. Thus varying the ON duty ratio to adjust the current brings about the state in which the ON duty ratio becomes less than 50% as described with reference to FIG. 2. This presents a problem in the operation of the voltage-multiplier rectifier circuit.

In the course of starting the discharge lamp 22 by charging the capacitor 13 and capacitor 20, the voltage across the capacitor 13 reaches the high voltage of about 400 V in advance, for example. If the control for reducing the ON duty ratio of the transformers T1 and T2 is carried out in response to this, the capacitor 20 is not charged sufficiently. This presents a problem in that the voltage across the capacitor 20 does not reach the high voltage of about 800 V, for example, and the GAP switch 21 does not close.

In the discharge lamp ballast apparatus of the embodiment 1, the control section 4 fixes the ON duty ratio of the transformers T1 and T2 at 50% or more, and operates them in an intermittent operation mode which has a period for performing the output operation and a period for taking a rest. The intermittent operation carried out with keeping the ON duty ratio of the transformers T1 and T2 constant at 50% can maintain the voltage across the capacitor 13 at the predetermined value by effectively operating the DC/DC converters and voltage-multiplier rectifier circuit, and charge the capacitor 20. In other words, the control section 4 maintains the voltage across the capacitor 13 at the ballast voltage by repeating supplying the charge current of a constant magnitude and then halting the supply rather than by suppressing by reducing the ON duty ratio the charge current supplied to the capacitor 13 that develops the ballast voltage across it. In addition, since the ON duty ratio is constant throughout the operation, the predetermined voltage such as E+e is supplied to the voltage-multiplier rectifier circuit. This enables the voltage-multiplier rectifier circuit to generate the high voltage normally, thereby being able to charge the capacitor 20 effectively.

FIG. 3 is a diagram illustrating the operation of the discharge lamp ballast apparatus of the embodiment 1: a timing chart illustrating the output voltages of the transformer T1 and transformer T2. As illustrated in FIG. 3, the control section 4 brings both the transformer T1 and transformer T2 into operation or rest at the same timing. As described before, the control section 4 is connected in such a manner as to detect the voltage across the capacitor 13. It controls the switching devices 2 and 3 until the voltage across the capacitor 13 reaches 400 V, for example, and causes the transformers T1 and T2 to output rectangular wave voltages with their phases shifted from each other.

Incidentally, the capacitor 13 has its first end, which constitutes the high-side output point of the DC/DC converter, grounded. Accordingly, the voltage of the capacitor 13 detected by the control section 4 becomes negative with respect to the GND level. Thus, the foregoing "400 V" becomes −400 V. In the following description, however, the voltage across the capacitor 13 is handled as the potential difference across the capacitor 13 rather than as the value seen from the GND level.

The control section 4 halts, when the potential difference it detects reaches 400 V, the ON/OFF operation of the switching devices 2 and 3, thereby stopping the output operation of the transformers T1 and T2. When the potential difference it detects becomes less than the predetermined value, that is, less than 400 V, the control section 4 puts the switching devices 2 and 3 into operation to have the transformers T1 and T2 output the voltages. In this way, the control section 4 puts the DC/DC converter including the transformer T1 and the DC/DC converter including the transformer T2 into intermittent operation. In addition, the DC/DC converters are both constructed in such a manner as to maintain their output voltages using the capacitor 13. Accordingly, the control section 4 controls in such a manner as to synchronize the intermittent operation of the two DC/DC converters. The ON duty ratio of the transformers T1 and T2 is always kept constant at 50% throughout the operation. Thus, the voltage-multiplier rectifier circuit receives the constant high voltage, and maintains the output voltage at the constant high voltage. Therefore, the capacitor 20 of the IGN circuit is charged effectively.

Generally, the AC voltage supplied to the discharge lamp 22 in the steady lighting state, that is, the AC voltage output from the DC/AC inverter, has a frequency of about a few hundred hertz. In contrast, the frequency of the output voltages of the transformers T1 and T2, that is, the operation frequency of the DC/DC converter, is much higher than the frequency of the AC voltage. Using the output voltages of the transformers T1 and T2 enables the capacitors to be charged in a short time. Operating the voltage-multiplier rectifier circuit using the output voltages of the transformers T1 and T2 makes it possible to generate the highly enough voltage even if the capacitances of the capacitors 10-12 constituting the circuit are set at small values, thereby being able to miniaturize the voltage-multiplier rectifier circuit using the capacitor with smaller outer dimensions.

In addition, since the output voltages of the DC/DC converters and the output voltage of the voltage-multiplier rectifier circuit are generated using the output voltages of the transformers T1 and T2 which are connected in parallel seen from the power supply 1 and operate alternately, the transformers T1 and T2 can generate the voltages with small ripples, and suppress the noise generated during the operation of the circuit.

As described above, the embodiment 1 constructs the voltage-multiplier rectifier circuit in such a manner as to generate the high voltage used for starting the discharge lamp 22 by inputting the potential difference between the output voltages of the two transformers T1 and T2. Thus, the present embodiment 1 can limit the number of components, and hence can save the cost and miniaturize the apparatus.

In addition, the control section 4 operates in such a manner as to operate the transformers T1 and T2 with maintaining the ON duty of the switching devices 2 and 3 at the constant value; to halt the operation of the transformers T1 and T2 when the capacitor 13 for holding the output voltages of the DC/DC converters reaches the ballast voltage; and to supply the capacitor 13 with the voltages by operating the transformers T1 and T2 when the voltage across the capacitor 13 falls below the ballast voltage. Thus, the voltage-multiplier rectifier circuit can receive the predetermined potential difference, and generate the normal high voltage. This offers an advantage of being able to charge the capacitor 20 of the IGN circuit effectively.

INDUSTRIAL APPLICABILITY

As described above, the present invention has the control means for controlling the operation of the transformers of the DC/DC converters, and the voltage-multiplier rectifier circuit for generating the high voltage. Thus, the present invention is suitable for implementing a small, low cost discharge lamp ballast apparatus.

What is claimed is:
1. A discharge lamp ballast apparatus comprising:
a plurality of DC/DC converters which include transformers for boosting a power supply voltage, and are connected in parallel;
control unit for controlling operation of the transformers of said DC/DC converters; and
a voltage-multiplier rectifier circuit that generates a high voltage to start a discharge lamp by utilizing a potential difference between output voltages of the transformers, wherein
said control unit controls the transformers in a manner as to shift operation phases of the transformers of said DC/DC converters; and further wherein
said voltage-multiplier rectifier circuit includes a Cockcroft-Walton circuit.

2. The discharge lamp ballast apparatus according to claim 1, wherein
said voltage-multiplier rectifier circuit receives the voltages from secondary windings of the transformers which generate a ballast voltage of the discharge lamp.

3. The discharge lamp ballast apparatus of claim 1, further comprising a discharge lamp ignition circuit that receives the output of the voltage-multiplier rectifier circuit.

4. The discharge lamp apparatus of claim 1, further comprising a DC/AC inverter.

5. The discharge lamp ballast apparatus of claim 4, wherein said DC/AC includes at least one transistor.

6. The discharge lamp apparatus of claim 5, wherein said at least one transistor comprises an n-channel FET.

7. The discharge lamp ballast of claim 5, further comprising a first electrode of a discharge lamp connected to said at least one transistor.

8. A discharge lamp ballast apparatus comprising:
a plurality of DC/DC converters which include transformers for boosting a power supply voltage, and are connected in parallel;
control unit for controlling operation of the transformers of said DC/DC converters; and
a voltage-multiplier rectifier circuit that generates a high voltage to start a discharge lamp by utilizing a potential difference between output voltages of the transformers, wherein
said control unit controls the transformers in a manner as to shift operation phases of the transformers of said DC/DC converters; and further wherein
said control unit adjusts the operation phases and duty of the transformers of said DC/DC converters in a manner as to increase the potential difference to be supplied to said voltage-multiplier rectifier circuit.

9. A discharge lamp ballast apparatus comprising:
a plurality of DC/DC converters which include transformers for boosting a power supply voltage, and are connected in parallel:
control unit for controlling operation of the transformers of said DC/DC converters; and
a voltage-multiplier rectifier circuit that generates a high voltage to start a discharge lamp by utilizing a potential difference between output voltages of the transformers, wherein
said control unit controls the transformers in a manner as to shift operation phases of the transformers of said DC/DC converters; and further wherein
said control unit halts voltage outputs of the transformers when a voltage across a capacitor for holding an output voltage of said DC/DC converters at a ballast voltage of the discharge lamp reaches the ballast voltage; and causes the transformers to output voltages when the voltage across the capacitor becomes less than the ballast voltage.

10. A discharge lamp ballast apparatus comprising:
a plurality of DC/DC converters, where said converters include transformers that boost a power supply voltage and said transformers are connected in parallel;
a control unit that controls operation of said DC/DC converters; and
a high voltage generating circuit, said generating circuit including at least a first capacitor and a first diode and a second capacitor and a second diode, and where
said generating circuit charges said first capacitor to a first voltage with a DC voltage, said DC voltage including an output voltage of one transformer, said output voltage of one transformer being rectified by said first diode at a first timing of AC waveforms output from said one transformer,
said generating circuit charges said second capacitor to a second voltage, said second voltage being the sum of the first voltage and the DC voltage, where the DC voltage further includes an output voltage of a second transformer, said output voltage of a second transformer being rectified by said second diode at a second timing, said second timing having a different phase than said first timing, thereby making the DC voltage higher than the output voltages of said transformers at terminals of said second capacitor, and said control unit controls said DC/DC converters in such manner as to shift operation phases of said transformers.

11. The discharge lamp ballast apparatus of claim 10, where the second voltage is higher than the first voltage at the second timing.

12. The discharge lamp ballast apparatus of claim 10, where said first and second capacitors are connected between outputs of said transformers, and where said generating circuit charges said first capacitor via said first diode at the first timing; and charges said second capacitor via said first capacitor and said second diode at the second timing, where an output polarity of at least one transformer is inverted.

13. The discharge lamp ballast apparatus of claim 10, said high voltage generating circuit further including a third capacitor and a third diode, and where said generating circuit:

charges said third capacitor to the voltage stored in said second capacitor at a third timing, said third timing being a repetition of the first timing and having the same phase as the first timing; and generates a voltage higher than an output voltage of said second capacitor at terminals of said third capacitor.

14. The discharge lamp ballast apparatus of claim 10, said high voltage generating circuit further including a certain amount, n, of capacitors and said certain amount, n, of diodes, and where said generating circuit:

charges the first capacitor to an odd timing voltage corresponding to a potential difference of the output voltages of said transformers at a first timing and an odd-numbered timing having the same phase as the first timing;

charges an odd-numbered capacitor after a third capacitor to a voltage corresponding to a voltage stored in an even-numbered capacitor immediately before said odd numbered capacitor;

charges the second capacitor to an even timing voltage that is the sum of the odd timing voltage and voltage corresponding to a potential difference of the output voltages of said transformers at a second timing and an even-numbered timing having the same phase as the second timing; and charges an even-numbered capacitor after the fourth capacitor to a voltage corresponding to a voltage stored in an odd-numbered capacitor immediately before said even-numbered capacitor;

said circuit thereby generating substantially n times the output voltages of said transformers at terminals of an nth capacitor.

* * * * *